United States Patent
Pardo et al.

(10) Patent No.: US 9,975,797 B2
(45) Date of Patent: May 22, 2018

(54) METHOD FOR ULTRA-DEHYDRATING THICKENED OR PASTY BIOMASS PRODUCTS, AND EQUIPMENT FOR IMPLEMENTING THE METHOD

(71) Applicant: DEGREMONT, Paris la Defense (FR)

(72) Inventors: Pierre Emmanuel Pardo, Orsay (FR); Eric Judenne, Chaville (FR)

(73) Assignee: DEGREMONT (FR)

( * ) Notice: Subject to any disclaimer, the term of this patent is extended or adjusted under 35 U.S.C. 154(b) by 0 days. days.

(21) Appl. No.: 14/888,531

(22) PCT Filed: May 2, 2014

(86) PCT No.: PCT/IB2014/061156
§ 371 (c)(1),
(2) Date: Nov. 2, 2015

(87) PCT Pub. No.: WO2014/178028
PCT Pub. Date: Nov. 6, 2014

(65) Prior Publication Data
US 2016/0052815 A1    Feb. 25, 2016

(30) Foreign Application Priority Data

May 3, 2013    (FR) .................................... 13 54088

(51) Int. Cl.
| | | |
|---|---|---|
| *C02F 11/10* | (2006.01) | |
| *C02F 11/12* | (2006.01) | |
| *C02F 1/00* | (2006.01) | |
| *C02F 9/00* | (2006.01) | |
| *C10L 5/44* | (2006.01) | |

(52) U.S. Cl.
CPC ............ *C02F 11/10* (2013.01); *C02F 11/122* (2013.01); *C02F 1/008* (2013.01); *C02F 9/00* (2013.01); *C02F 2209/02* (2013.01); *C02F 2209/42* (2013.01); *C02F 2209/44* (2013.01); *C02F 2301/063* (2013.01); *C02F 2301/066* (2013.01); *C02F 2303/02* (2013.01); *C10L 5/445* (2013.01); *Y02W 10/40* (2015.05)

(58) Field of Classification Search
CPC combination set(s) only.
See application file for complete search history.

(56) References Cited

U.S. PATENT DOCUMENTS

| | | | |
|---|---|---|---|
| 3,207,064 A | 9/1965 | Hauser-Bucher | |
| 5,143,628 A | 9/1992 | Bott et al. | |
| 2005/0042152 A1* | 2/2005 | Gardner ................. | B01J 19/121 422/186.3 |
| 2016/0312125 A1* | 10/2016 | Linck ....................... | C10G 1/08 |

FOREIGN PATENT DOCUMENTS

| | | |
|---|---|---|
| CN | 102875005 | 1/2013 |
| EP | 1970431 | 9/2008 |
| WO | 03043939 | 5/2003 |

OTHER PUBLICATIONS

Corresponding International Search Report for PCT/IB2014/061156 dated Mar. 9, 2014. WO.

* cited by examiner

Primary Examiner — Ellen McAvoy
Assistant Examiner — Chantel Graham
(74) Attorney, Agent, or Firm — The Belles Group, P.C.

(57) ABSTRACT

The invention relates to a method for ultra-dehydrating thickened or pasty biomass products, in particular sludge from wastewater treatment plants, according to which the products, in particular products having a dryness of 4% to 25%, are subjected to the following steps: hydrothermal carbonization treatment, including pressurization (1, 2) and thermal conditioning (30) for a duration in a closed reactor (4); followed by dehydration of the products by a ram press (12), obtaining a dryness of more than 50%; the temperature of the product upstream from the ram press dehydration being regulated by cooling between 40° C. and 90° C., advantageously to around 70° C., in order to optimize the filterability in the piston press; the steps of the method being performed in a confined space making it possible to prevent the release of smells into the atmosphere.

8 Claims, 3 Drawing Sheets

Figure 1:
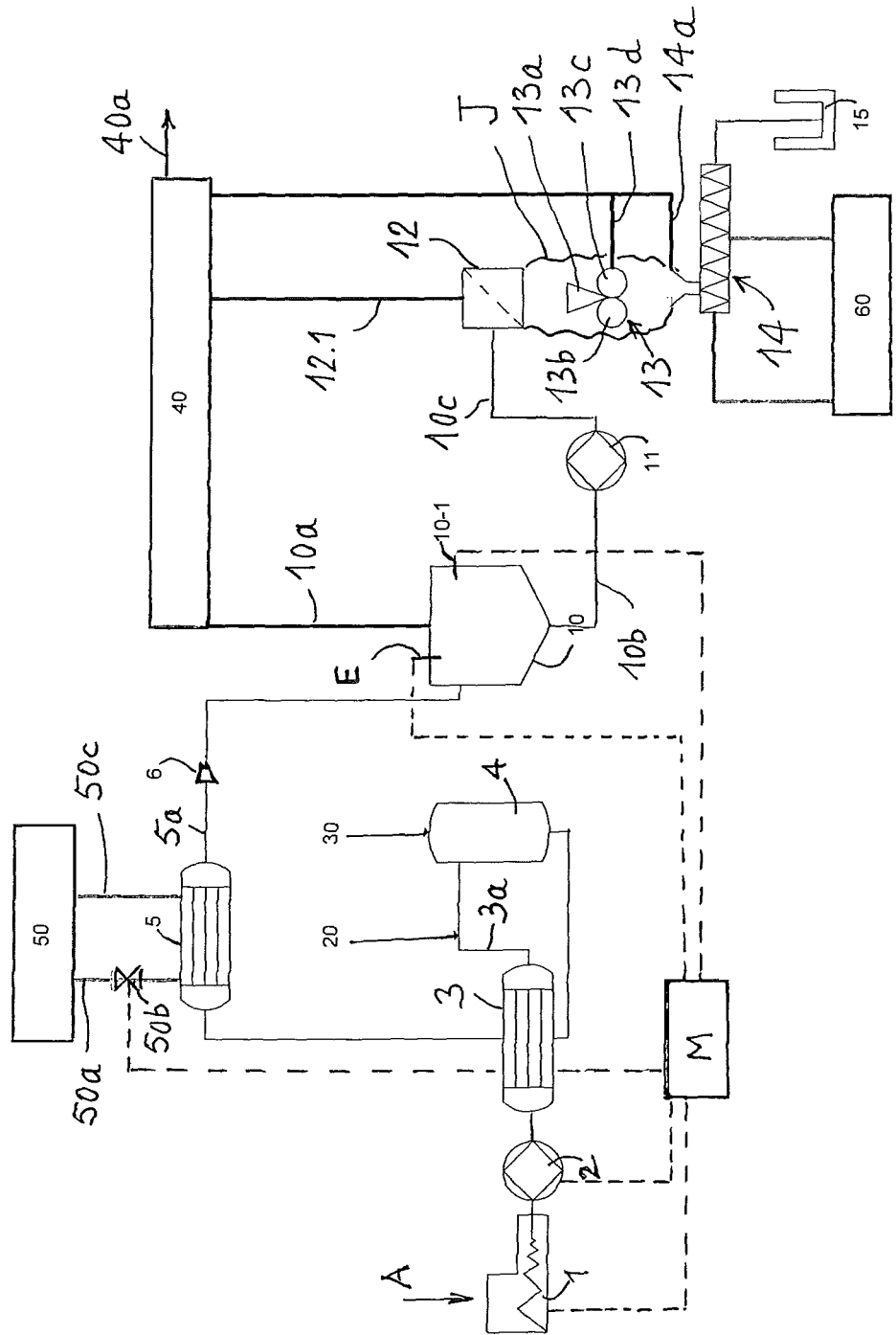

METHOD FOR ULTRA-DEHYDRATING THICKENED OR PASTY BIOMASS PRODUCTS, AND EQUIPMENT FOR IMPLEMENTING THE METHOD

PRIORITY

Priority is claimed as a national stage application, under 35 U.S.C. § 371, to international patent application No. PCT/IB2014/061156, filed May 2, 2014, which claims priority to French patent application 1354088, filed May 3, 2015. The disclosures of the aforementioned priority applications are incorporated herein by reference in their entirety.

The invention relates to a method for ultra-dehydrating thickened or pasty products forming a biomass, in particular treatment plant sludge.

The drying of such products is useful for a multi-sector recycling of the dried products, in particular for:
- long-term storage without fermentation;
- simple agricultural recycling that is acceptable to the population, owing to a "sanitized" product;
- an advantageous thermal recycling.

But the drying technology is accompanied by several impediments, in particular:
- its high energy consumption, mainly based on fossil energy;
- the complexity of storing organic dried products that may readily self-combust.

A sludge ultra-dehydrated to at least 50% dryness and preferably to 65% or more dryness has the advantages of:
- absence of self-combustion during storage;
- while retaining an advantageous thermal recycling;
- sanitization of the product.

Dryers that currently exist, of direct or indirect type, may require, for the drying of the sludge, an energy of around 900-1100 kWh/TWE (tonne of water evaporated).

Systems of dryers with pre-evaporation of the sludge make it possible to obtain lower consumptions, of around 700-800 kWh/TWE.

Dryers that use heat pumps claim purely electrical consumptions of 300 kWhe/TWE (kWhe=kilowatt-hour electrical), which amounts to an equivalent of around 900 kWh/TWE in terms of thermal energy.

Dryers that use mechanical steam compression claim thermal consumptions of less than 300 kWhe/TWE, but mechanical steam compression technology has not displayed industrial implementability.

Furthermore, thermal conditioning of pasty products, and of sludge in particular, has displayed an ability to substantially improve the dryness of a sludge by filter press dehydration. Thermal conditioning consumes little energy, in particular when it is used on pasty and non-liquid products since it does not carry out evaporation of water but only a heating. There is therefore no noticeable heat loss.

One drawback of filter presses lies in the disassembling operation which consists in discharging the filter cake from the press. This filter press operation generally requires a manual intervention, and the automation thereof is difficult, if not impossible. The pressing and disassembling operation of a conventional plate filter press is accompanied by the release of odors into the atmosphere.

Moreover, the method of drying with thermal conditioning and filter press is accompanied by problems of integration of the procedure for producing ultra-dehydrated sludge regarding in particular:
- the total energy consumption for producing a sludge ultra-dehydrated to at least 50% dryness;
- the management of the odors over the whole of the treatment train;
- the automation of the treatment train;
- the ability to manage and store ultra-dehydrated sludge.

The objective of the invention is, above all, to propose a method that makes it possible to very substantially reduce, relative to thermal drying, the total energy consumption for producing a sludge ultra-dehydrated to at least 50% dryness. The method must in addition make it possible to: manage the odors, prevent them from leaking into the atmosphere, automate the production and improve the ability to manage and store ultra-dehydrated sludge.

The invention makes provision for the coupling of a hydrothermal carbonization of dehydrated sludge, in particular having a dryness of 4% to 25%, with a ram press.

According to the invention, the method for ultra-dehydrating thickened or pasty products, forming a biomass, in particular treatment plant sludge, is characterized in that the products, in particular having a dryness of 4 to 25%, are subjected to the following steps:
- hydrothermal carbonization treatment, comprising a pressurization and a thermal conditioning for a residence time in a closed reactor, followed by a decompression,
- then dehydration of the products by a ram press, obtaining a dryness of greater than 50%,
- the temperature of the product upstream of the dehydration by the ram press being regulated by cooling between 40 and 90° C., advantageously at around 70° C., in order to optimize the filterability in the ram press, the steps of the method being carried out in a confined space that makes it possible to prevent the diffusion of odors into the atmosphere.

Preferably, for the hydrothermal carbonization treatment, the pressurization in the reactor is between 10 and 30 bar, preferably of the order of 20 bar, and the thermal conditioning is carried out by heating the products between 150 and 250° C. in the reactor.

The residence time of the products in the reactor is generally several minutes, in particular between 15 and 200 minutes.

The method advantageously comprises a preheating of the product before the hydrothermal carbonization treatment.

The hydrothermal carbonization treatment may comprise the following additional steps:
- an injection of reactant upstream of or into the reactor in order to promote the reaction,
- a heating in order to supplement the temperature in the reactor.

Preferably, the dehydration of the products by a ram press is carried out through flexible drains that form filters, which are permeable to the liquid that passes from the outside to the inside of the drains, whilst the solid materials are retained on the outside in order to be discharged by disassembling.

The regulation of the temperature of the product upstream of the dehydration may be carried out with the aid of a chiller heat exchanger.

Advantageously, a conditioning of the product exiting the ram press is carried out using a crusher or a grinder.

A dedicated cooling of the product exiting the ram press may be carried out in order to reduce its temperature, preferably to a value below 40° C. The dedicated cooling may be of indirect type and be carried out under vacuum.

A covered and deodorized store of product may be created between the hydrothermal carbonization treatment and the ram press. An automatic start-up of the dehydration phase by the ram press may be carried out as a function of the level of product in the store.

Advantageously, a regulated deodorization is carried out during the disassembling phase by a vacuum application enabling a bleeding of the gases or vapors that generate the odors. The non-condensable gases may be subjected to a cooling. A use of the non-condensable gases is possible in a boiler for thermal and odor-treatment purposes.

The invention also relates to an apparatus for ultra-dehydrating thickened or pasty products forming a biomass, in particular treatment plant sludge, especially for the implementation of the method defined above, characterized in that it comprises:
- a unit for carrying out a hydrothermal carbonization treatment, comprising a means for pressurizing the products, a means for preheating these products, a closed reactor for a carbonization residence time of the reheated products, and a means for decompressing the products,
- a device for cooling the products exiting the hydrothermal carbonization treatment, in particular a chiller heat exchanger,
- a ram press for dehydrating the products after hydrothermal carbonization treatment, obtaining a dryness of greater than 50%, the various components of the apparatus being in a confined space that makes it possible to prevent the diffusion of odors into the atmosphere and to manage these odors.

A covered and deodorized storage tank may be positioned between the hydrothermal carbonization treatment unit and the ram press.

Preferably, the ram press is provided in order to carry out a pressing of the products through flexible drains that form filters, which are permeable to the liquid that passes from the outside to the inside of the drains under the effect of the pressure between two plates between which the drains extend, which drains deform when the plates approach one another, whilst the solid materials are retained on the outside of the drains in order to be discharged during the disassembling.

The apparatus may comprise a control assembly that makes it possible to control the filterability of the product, the control assembly carrying out a measurement of the filtration time of the sludge at each pressing carried out by a ram of the ram press, the combined filtration times being compared to a reference value, and if the filtration duration, corresponding to the sum of the combined times, increases, the control assembly gives a higher temperature set point for the sludge introduced into the press.

Advantageously, the control assembly controls the amount of reactant injected if the regulation of the temperature reaches its limit.

The ram press may have, upon disassembling, a slow opening sequence having a duration of at least 10 seconds in order to make it possible to channel the odors.

A connection between the outlet of the ram press and the crusher or the grinder may be produced in the form of a rigid hopper and/or a flexible sheath forming a duct and enabling the channeling of the odors.

Preferably, all of the zones of the apparatus that may generate odors, in particular the store, the ram press and the crusher are placed under vacuum by a deodorizing ventilation system.

The apparatus, according to one variant, may comprise a direct feed of the ram press after a decompression, downstream of the hydrothermal carbonization treatment unit.

Among the advantages provided by the invention, mention may be made of:
- a reduced energy consumption,
- an effective management of the odors,
- a possibility of automatic operation,
- suitable storage of the ultra-dehydrated sludge.

Figure 2:
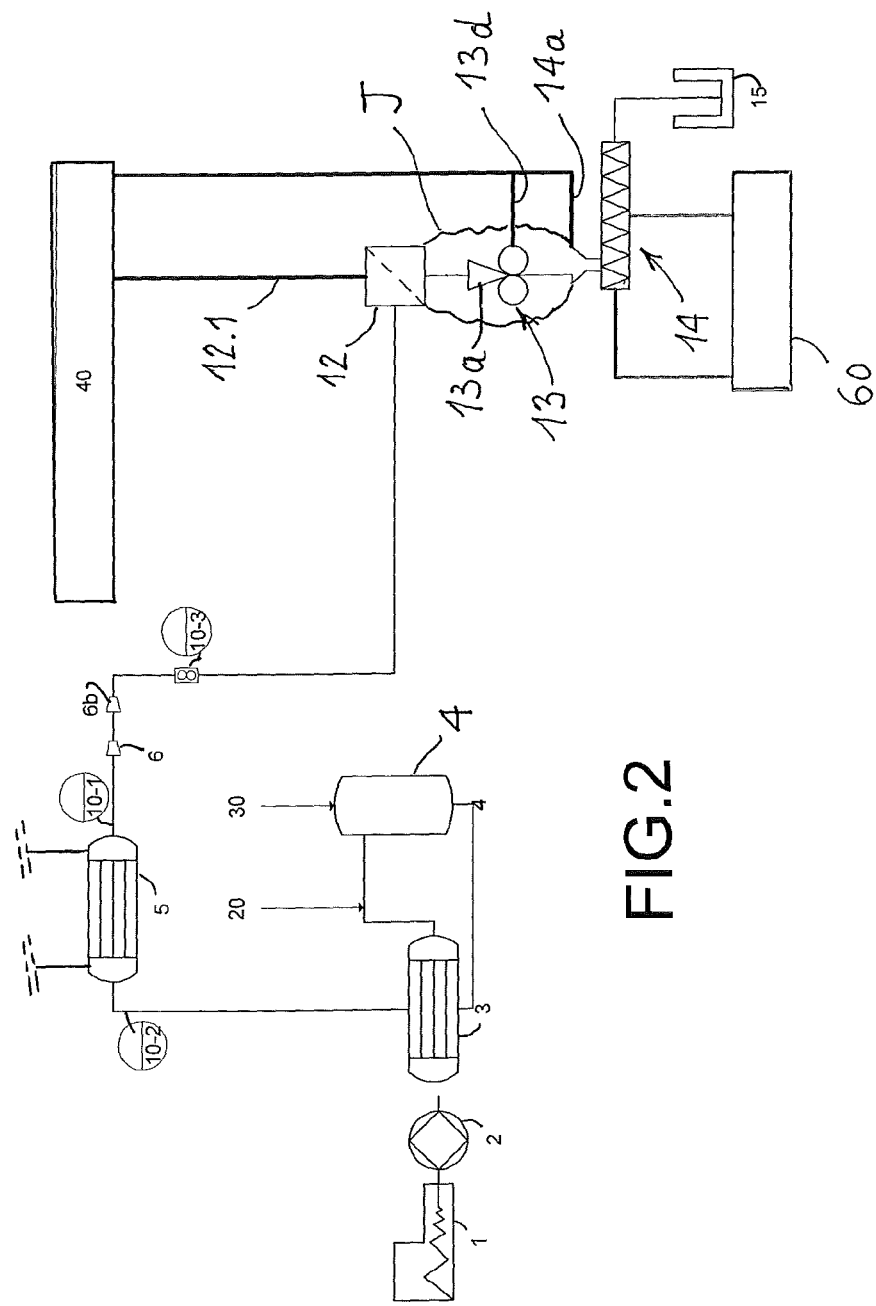
Figure 3:
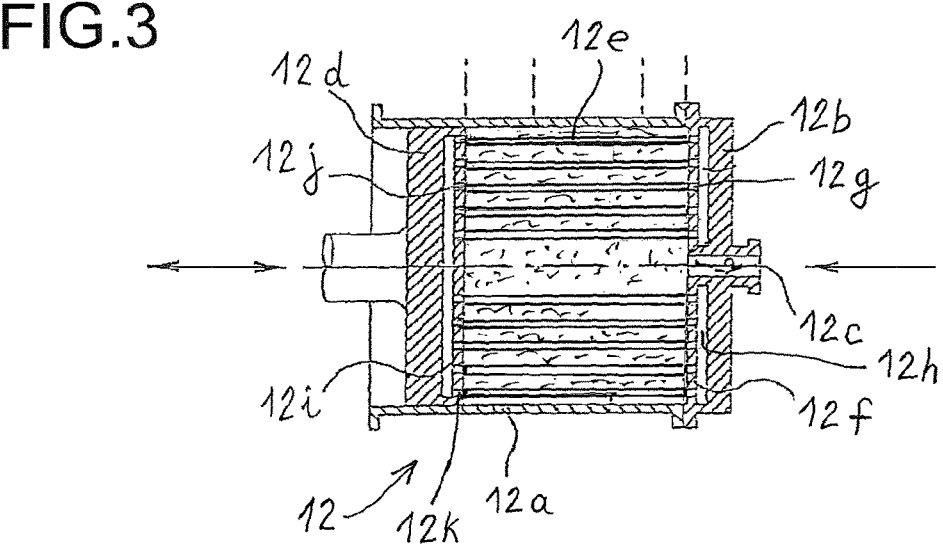
Figure 4:
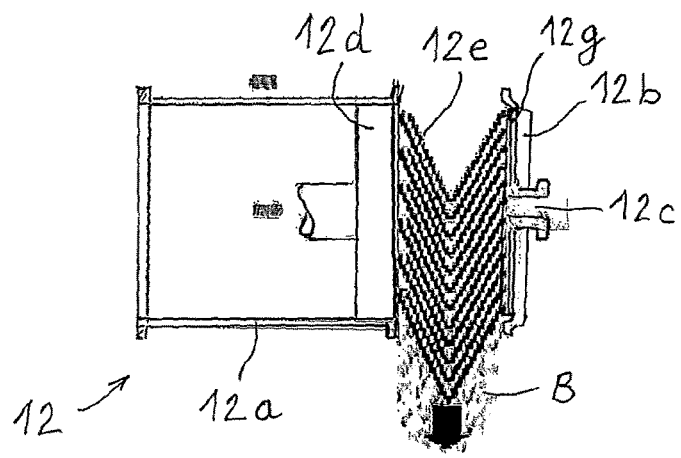

The invention consists, apart from the provisions set out above, of a certain number of other provisions which will be mentioned more explicitly below with respect to exemplary embodiments described with reference to the appended drawings, but which are in no way limiting. Regarding these drawings:

FIG. 1 is a diagram of an apparatus for dehydrating pasty products, in particular treatment plant sludge, according to the invention, FIG. 2 is a diagram of a variant of the apparatus from FIG. 1, FIG. 3 is a schematic axial vertical cross section of a ram press during operation, and FIG. 4 is an axial vertical cross section of the ram press during the disassembling operation.

By referring to FIG. 1 of the drawings, it can be seen that the pasty product to be dehydrated, in particular the treatment plant sludge, is introduced, as indicated by the arrow A, into a pressurizing assembly comprising feeding equipment, formed by a screw 1, and a pumping means formed by a pump 2. The product introduced has a dryness of between 4 and 25%. The pumping assembly 1, 2 may be of the piston pump, gerotor, lobe pump or any other conventional pressurizing configuration type.

The product leaves the pump 2 under pressure, preferably between 10 and 30 bar, advantageously of the order of 20 bar, in order to be preheated in a heat exchanger 3.

The preheated product leaving the exchanger 3 is sent, via a duct 3a, to a closed reactor 4 in order to remain therein for a residence time of several minutes, in particular of 15 to 200 minutes, in order to undergo a hydrothermal carbonization therein. The products are heated in the reactor 4, at a temperature generally between 150-250° C., according to a conditioning, in particular a pressure of between 15 and 25 bar, advantageously of the order of 20 bar, which permits the catalysis. All types of hydrothermal carbonization may be carried out.

A decompression of the products, leaving the reactor 4, is provided, in particular with the aid of a decompression means, such as a valve 6, installed on the duct through which the products leaving the reactor 4 pass.

The hydrothermal carbonization comprises, preferably, the following additional steps:
- an injection 20 of reactant upstream of the reactor 4, as illustrated in FIG. 1, or into this reactor, in order to promote the hydrothermal carbonization reaction;
- a heating means 30 in order to adjust the temperature in the reactor 4;
- a cooling means, in particular a heat exchanger 5, for cooling the outgoing product before the decompression thereof by the valve 6.

The heat exchanger 3 may be provided for a reheating of the product that arrives, via the product leaving the reactor 4, as illustrated in FIG. 1. As a variant, the heat exchange may be provided via an intermediate fluid, in particular between the product that arrives and oil for the heating, or another conventional configuration for heating products.

The reactor 4 may be in various shapes and may or may not be provided with a stirrer, and/or baffles. The decompression may be provided by the valve 6 or by a diaphragm or other mechanical means.

The means for heating the pasty products, in particular the sludge, for maintaining it at temperature, decompressing it, may assume any conventional configuration.

The means 30 for heating the reactor 4 may be an indirect heating means comprising a shell surrounding the reactor 4 in order to form a chamber in which a hot fluid circulates, or a direct heating means consisting of an injection of steam into the reactor 4.

The reactant(s) of the injection 20 for the hydrothermal carbonization may be selected from conventional reactants such as oxidant, acid, or a combination of the two.

The cooling of the outgoing product in the exchanger 5 may be carried out by any type of conventional exchanger between outgoing product/cooling air, or outgoing product/cooling water.

The coolant of the exchanger 5 comes from a unit 50, via an inlet duct 50a provided with an adjustable opening valve 50b controlled by a control assembly M. The coolant, reheated in the exchanger 5, returns via a duct 50c to the unit 50 in order to be cooled therein or be replaced therein by an already cold fluid.

The cooling provided by the exchanger 5 is regulated in order to enable an optimization of the dehydration. Indeed, if the product leaving the exchanger 5 is too hot, large amounts of steam are released, whereas if the product is too cold, the subsequent ultra-dehydratability is compromised. The temperature of the product leaving the exchanger 5 is adjusted in order to optimize the filterability of the product during the step of dehydration by a ram press 12. Advantageously, the temperature of the product leaving the exchanger 5 is between 40° C. and 90° C., in particular around 70° C.

The hydrothermal carbonization unit, comprising the elements 1 to 6, 20 and 30, is produced in a leaktight manner, so that gases or vapors cannot escape into the atmosphere. In the case of a rotary seal, a suction of the odors at this seal is put in place.

The products, in particular the sludge, conditioned by the hydro thermal carbonization and cooled, are sent via a duct 5a to a sealed storage tank, or chamber, 10 placed under a slight vacuum, by means of a draft drawn by a duct 10a connected to the tank 10, from a suction unit 40. The unit 40 also provides a treatment of the air before its release into the atmosphere.

At least one temperature sensor 10-1 permanently provides the temperature in the mass of products contained by the tank 10. This temperature is communicated to the control assembly M which adjusts the flow rate of coolant in the exchanger 5 in order to maintain a product temperature, in the tank 10, that enables the best filterability during the following step, with minimum revaporization. Preferably, the temperature of the product in the chamber 10 and at the outlet thereof into a duct 10b is maintained between 40° C. and 90° C., advantageously substantially equal to 70° C.

Means for mixing the product in the storage tank 10 may be provided if the volume of this tank is such that the temperature measurement 10-1 at one point risks not being representative of the temperature of the various zones of the product. The number of measurement instruments, in particular of temperature sensors, may be adapted as a function of the size of the tank 10 and of the mass of products stored in order to enable a representativity of the overall temperature measurement. The storage tank 10 may also comprise a means E for measuring the level of product. The result of the level measurement is sent to the control assembly M for the automation of the treatment process:

in the case of a high level that exceeds a given high limit, the stoppage of the operation of the thermal conditioning is controlled, by stoppage of the pumping assembly 1, 2;

in the case of a low level, below a given low limit, the operation of the units downstream of the tank 10, in particular of a pump 11 and of a ram press 12, is stopped;

in case where the level in the tank 10 is between the low limit and the high limit, the dehydration by the ram press 12 is started up, as is the pump 11 that ensures the transfer of the product between the outlet of the tank 10 and the inlet of the ram press 12.

The sludge leaving the tank 10 via the duct 10b is taken up by the high-pressure pump 11 which feeds the ram press 12.

As can be seen in FIG. 3, the filtration in the ram press 12 is carried out in a closed cylinder 12a which makes it possible to keep the odors confined throughout the pressing. At one end, located on the right according to FIG. 3, the cylinder 12a is sealed in a leaktight manner by a plate 12b, which may be moved apart therefrom in the axial direction as illustrated in FIG. 4.

The product to be pressed is introduced into the cylinder 12a via a channel 12c provided at the center of the plate 12b. At a distance from the plate 12b, a ram 12d subjected to a hydraulic or pneumatic pressure may slide in a leaktight manner into the cylinder 12 in order to press the products introduced into the cylinder 12. Drains 12e, formed by flexible sheaths made of material that is permeable to the liquid but impermeable with regard to the solids, are attached to a counterplate 12f separate from the plate 12b, but connected thereto. Each drain 12e comprises an internal passage that opens into an associated opening 12g, provided in the counterplate 12f. The openings 12g communicate with a chamber 12h, between the counterplate 12f and the plate 12b, which connects the liquid, essentially water, discharged to the outside via a duct, not visible in FIG. 3.

At their other end, the drains 12e are attached to a plate 12i connected to the ram 12d from which it is separated in order to define, with the ram, a chamber 12j which recovers the liquid that has passed through the drains 12e. The drains are connected to openings 12k that pass through the plate 12i and open into the chamber 12j. The drains 12e extend substantially parallel to the geometric axis of the cylinder 12a when the ram is as far away as possible from the plate 12b.

During the pressing, the ram 12d carries out back-and-forth movements in the direction of the axis of the cylinder 12a, while the plate 12b is held against the end of the cylinder 12a. The flexible drains 12e deform; the liquid expressed from the product passes through the wall of the drains 12e and is discharged from the chamber 12h. During the pressing operation, the ram 12d and the plates 12h, 12f, 12b may be rotated about the geometric axis of the cylinder 12a.

When the pressing is finished, the disassembling of the pressed sludge B takes place as illustrated in FIG. 4. The plate 12b moves in order to allow the opening of the chamber; the ram 12d is brought to the end of the cylinder 12a facing the plate 12b. The pressed material B escapes via gravity into the space thus freed while the drains 12e take on a V-shape configuration. A rotational movement of the drains and of the plates to which they are attached may in addition be carried out during the disassembling. All these disassembling operations may easily be rendered automatic.

The ram press 12, unlike other pressurized filtration devices of plate filter press or similar type, impart key advantages:

the filtration takes place in a sealed cylinder so that the odors remain trapped throughout the pressing;

the management of the odors is facilitated since it is possible to manage a slow opening of the cylinder in order to better channel the odors;

the disassembling may be carried out automatically, in particular owing to the movement of the drains 12e;

the dehydrated product may be disassembled in the form of pellets of relatively small size with the aid of a crusher or a grinder 13 (FIG. 1), unlike the filter-press cakes that leave in one piece and the size of which corresponds to that of the plates of the filter press;

the disassembling is carried out in a controlled geographic zone which may be isolated from the atmosphere by a shell, which makes it possible to treat the residues in a controlled manner and to prevent the propagation of the odors.

The filtered sludge B (FIG. 4), obtained at the end of pressing, leaves compact. In order to make it more easily transportable and storable, it is subjected to a crushing by falling into the crusher 13 (FIG. 1) suitable for dividing the filtered and ultra-dehydrated sludge into pellets or cords of reduced dimensions, in particular of the order of 10 mm. The crusher 13 may comprise a receiving chute 13a and two cylinders 13b, 13c that rotate in opposite directions, provided with teeth or protrusions that mesh, between which the dehydrated sludge undergoes a fragmentation.

To prevent the diffusion of the odors into the atmosphere, a rigid hopper or a flexible sheath J may be provided in order to surround the crusher 13 and the outlet of the press 12, and thus create leaktightness with respect to the atmosphere. The crusher 13 is also placed under a slight vacuum by a duct 13d that connects the internal volume of the crusher 13 to the suction unit 40.

A deodorizing system is installed above the ram press 12 via a duct 12.1 connecting the internal volume of the press 12 at the suction unit 40.

The disassembling of the ram press 12 takes place in one go in a well-delimited zone. The odors that may escape at the outlet of the press and in the crusher 13, in particular due to the fact of the heat still remaining, are controlled. The opening of the press is controlled in order to enable, at the start of this opening, the escape of most of the odor-generating vapors which are sucked up by the duct 12.1 and, where appropriate, by the duct 13d. The draft, providing the vacuum, from the unit 40 is strengthened at the moment of opening the press 12.

For the automation, the filtration time of the sludge at each pressing applied by the ram 12d is measured. The combined filtration times are compared to a reference value. If the filtration duration corresponding to the sum of the combined times increases, the control assembly M, forming the control unit, gives a temperature set point for the sludge in the tank 10, and therefore for the sludge introduced into the press 12, that is higher by one level that can be adjusted for a next filtration.

The injection 20 of reactant may be driven if the temperature 10-1 in the tank 10 reaches a programmable high threshold. In this case, it is no longer desired to increase the temperature and the dose of reactant injected is then played with in order to improve the filterability of the sludge in the press 12.

In order to ensure a storage of the dehydrated sludge leaving the crusher 13 under good conditions, cooling equipment 14 is provided, after the crusher 13, in order to supplement the cooling of the product and store it at a temperature below 40° C., in particular at ambient temperature.

The equipment 14 is also placed under vacuum with the aid of a duct 14a that connects the internal volume of the cooling equipment 14 to the suction unit 40. This vacuum application makes it possible to prevent escapes of odors, even though they are lower at this level.

Preferably, the equipment 14 consists of a water-cooled screw, or twin screw, which moves the dehydrated sludge from the outlet of the crusher 13 to a storage container 15. The fluid used for cooling the dehydrated sludge circulates by coming from a cooling unit 60, and returning thereto in order to discharge the heat extracted.

Other cooling equipment could be used, in particular air-cooling devices, such as perforated belts passed through by air, which air will then be treated to eliminate the odors before release into the atmosphere.

The non-condensable gases recovered by the suction unit 40 are cooled and discharged via a duct 40a. These non-condensable gases are advantageously used as fuel in a boiler for thermal and odor-treatment purposes; they may otherwise be treated more completely by any suitable physicochemical or biological means.

FIG. 2 illustrates an embodiment variant of the invention. The elements that are identical or similar to elements already described with respect to FIG. 1 are denoted by the same numerical references without their description being repeated.

According to this variant, the elements from FIG. 1 formed by the storage tank 10 and the high-pressure pump 11 are removed. The equipment is thus reduced and the odors, the main production of which takes place at the tank 10 from FIG. 1, may be better managed.

Instrumentation is added: a temperature-measuring probe 10-2 upstream of the exchanger 5, a valve 6b downstream of the decompression valve 6 and a flow meter 10-3 downstream of the valve 6b.

In this configuration, the operation of the thermal conditioning by hydrothermal carbonization, and that of the dehydration by ram press 12 are concomitant. However, because of the fact that the cycle of the ram press 12 is not continuous and comprises filling phases, pressing phases and emptying phases, there is no permanent flow in the thermal conditioning circuit. This can only lengthen the residence time of the product at high temperature and pressure, and leads to a better treatment.

In order to continue to regulate the temperature at the probe 10.1, which is an important point for the method of the invention, the operation of the exchanger 5 is coupled to the flow rate measurement 10-3. When the flow rate is zero, for example during the phase of emptying the reactor 4, the circulation of the coolant in the exchanger 5 is stopped.

Moreover, the flow rate for filling the press 12, corresponding to the measured flow rate 10-3, is controlled by the decompression member 6. In this case, the member 6 is of reverse pump type, that can manage the regulation of the pressure and the stoppage of the emptying of the product, in particular of the sludge. The valve 6b is installed downstream of the decompression member 6, and makes it possible to ensure the absence of flow leakage.

Finally, the initial pumping, provided by the pumping assembly 1, 2 is also controlled in terms of flow rate by the ram press 12. Furthermore, within the context of this variant, it is possible to directly place a dumpster under the ram press for dehydration without cooling.

The combination, according to the invention, of a thermal conditioning of pasty products via a hydrothermal carbonization treatment, with a dehydration by a ram press makes it possible to obtain, with a minimal energy consumption, dehydrated products that have a dryness of greater than 50%, in particular of the order of 65%, and to control the odors that are prevented from leaking into the atmosphere. The dimensions of the whole of the apparatus are reduced with respect to conventional apparatuses carrying out an ultra-dehydration of sludge.

The invention claimed is:

1. An apparatus for ultra-dehydrating thickened or pasty products forming a biomass, the apparatus comprising:
   a unit for carrying out a hydrothermal carbonization treatment, comprising a means for pressurizing the products, a means for preheating these products, a closed reactor for a carbonization residence time of the reheated products, and a means for decompressing the products,
   a device for cooling the products exiting the hydrothermal carbonization treatment, in particular a chiller heat exchanger,
   a ram press for dehydrating the products after hydrothermal carbonization treatment and cooling, obtaining a dryness of greater than 50%,
   the various components of the apparatus being in a confined space that makes it possible to prevent the diffusion of odors into the atmosphere and to manage these odors,
   wherein the ram press is provided in order to carry out a pressing of the products through flexible drains that form filters, which are permeable to the liquid that passes from the outside to the inside of the drains under the effect of the pressure between two plates between which the drains extend, which drains deform when the plates approach one another, whilst the solid materials are retained on the outside of the drains in order to be discharged during the disassembling.

2. The apparatus as claimed in claim 1, wherein a covered and deodorized storage tank is positioned between the hydrothermal carbonization treatment unit and the ram press.

3. The apparatus as claimed in claim 1, further comprising a control assembly that makes it possible to control the filterability of the product, the control assembly carrying out a measurement of the filtration time of the sludge at each pressing carried out by a ram of the ram press, the combined filtration times being compared to a reference value, and if the filtration duration, corresponding to the sum of the combined times, increases, the control assembly gives a higher temperature set point for the sludge introduced into the press.

4. The apparatus as claimed in claim 1, wherein the ram press has, upon disassembling, a slow opening sequence having a duration of at least 10 seconds in order to make it possible to channel the odors.

5. The apparatus as claimed in claim 1, wherein a connection between the outlet of the ram press and the crusher is produced in the form of a rigid hopper and/or a flexible sheath forming a duct enabling the channeling of the odors.

6. The ultra-dehydrating apparatus as claimed in claim 1, further comprising a direct feed of the ram press after a decompression, downstream of the hydrothermal carbonization treatment unit.

7. The apparatus as claimed in claim 3, wherein the control assembly controls the amount of reactant injected if the regulation of the temperature reaches its limit.

8. The apparatus as claimed in claim 1, wherein all of the zones that may generate odors, in particular the store, the ram press and the crusher are placed under vacuum by a deodorizing ventilation system.

* * * * *

UNITED STATES PATENT AND TRADEMARK OFFICE
CERTIFICATE OF CORRECTION

| | | |
|---|---|---|
| PATENT NO. | : 9,975,797 B2 | Page 1 of 1 |
| APPLICATION NO. | : 14/888531 | |
| DATED | : May 22, 2018 | |
| INVENTOR(S) | : Pierre Emmanuel Pardo et al. | |

It is certified that error appears in the above-identified patent and that said Letters Patent is hereby corrected as shown below:

On the Title Page

In item (72) insert the following after "Eric Judenne, Chaville (FR)":
--Marc Buttmann, Düsseldorf (DE)--

Signed and Sealed this
Seventeenth Day of September, 2019

Andrei Iancu
*Director of the United States Patent and Trademark Office*